Jan. 30, 1968  J. C. FITCH  3,366,400

VEHICLE SUSPENSIONS

Filed Jan. 5, 1966

INVENTOR

JOHN C. FITCH

BY Strauch, Nolan, Neale,
Nies & Bronaugh
ATTORNEYS

United States Patent Office 3,366,400
Patented Jan. 30, 1968

3,366,400
VEHICLE SUSPENSIONS
John C. Fitch % John Fitch & Co., Inc., Limerock,
Falls Village, Conn. 06031
Filed Jan. 5, 1966, Ser. No. 518,897
3 Claims. (Cl. 280—124)

ABSTRACT OF THE DISCLOSURE

Suspension system for controlling a camber of the wheels of a swing axle vehicle in which an auxiliary spring system is arranged to oppose movements of said axles away from their neutral positions to minimize camber changes otherwise occasioned by changes in the dynamic and static vehicle loads.

---

Figure 1:
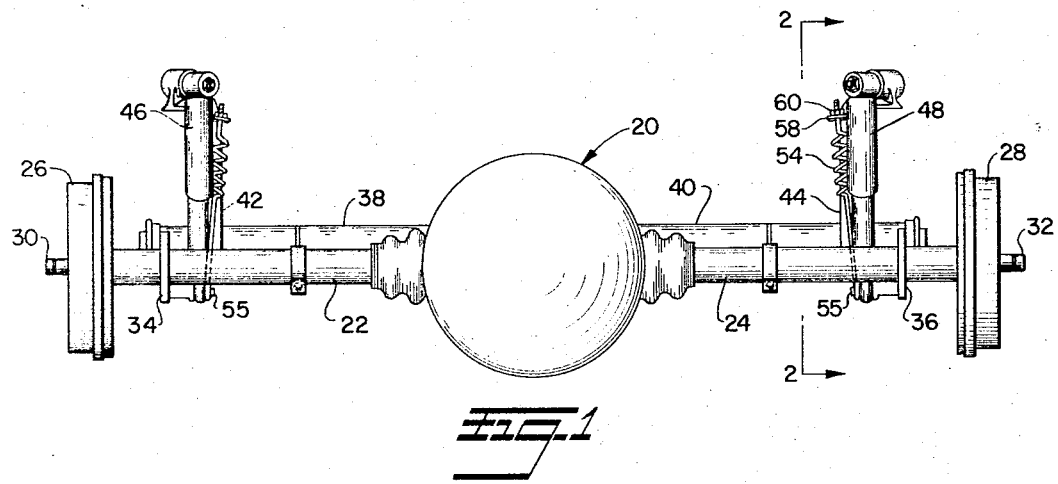

This invention relates to vehicle suspension systems and more particularly to auxiliary spring systems especially adapted for use in vehicles equipped with a swing axle.

Many vehicles now in widespread use incorporate a drive system including a fixed differential and a pair of drive axles connected at their inner ends by universal joints to the differential and connected at their outer ends to the driving wheels, which are independently suspended. This arrangement, which is commonly called a swing axle system, is currently used in the Volkswagen, Corvair, Mercedes, Porsche, and other vehicles. While this system has many advantages it has at least one major disadvantage, i.e., the change in camber inherently produced by a change in the loading of the vehicle or a change in the attitude of the vehicle, for example, during cornering.

In general, the handling characteristics of the vehicle and its stability are best when vehicle has zero or negative camber at operating load. It is a relatively simple matter to adjust the suspension of a racing vehicle to produce the desired camber since the weight of the vehicle is known and is not subject to substantial variation. In a passenger vehicle, however, where the load may vary by as much as 50% of the total weight of the vehicle, a compromise setting must be adopted. More specifically, in such a vehicle the suspension is adjusted to produce a substantial positive camber when the vehicle is lightly loaded, for example, with the driver only. When the vehicle is operated with the suspension adjusted in this manner marked loss of directional stability is experienced. If, however, the suspension is adjusted to produce the desired camber under light load, excessive negative camber is induced under heavy load and the suspension may bottom, the net effect of such an adjustment being to reduce the load carrying capacity of the vehicle.

A related problem involves the spring rate of the suspension. The tendency of the vehicle to pitch is a function of the relative spring rates of the front and rear suspensions under light load. In existing suspension systems a reduction in this ratio increases the tendency to pitch but provides a softer ride under normal conditions. Conversely an increase in the ratio may reduce pitching but provide a harsh ride.

With these considerations in mind, it is a principal purpose and object of the present invention to provide novel suspension controls for swing axle vehicles which overcome these problems and related problems and which decrease the tendency of the vehicle to pitch under light or normal loads and which are effective to reduce the camber of the rear wheels without decreasing the load carrying capacity of the vehicle.

It is a further object of the present invention to provide novel suspension control systems which may be incorporated in existing suspensions with little or no structural modification.

It is also an object of the present invention to provide suspension control systems for swing axle vehicles which are of uncomplicated mechanical construction and are inexpensive to manufacture and install.

In attaining these and other objects, the present invention provides an auxiliary spring system for the rear vehicle suspension, the auxiliary system being effective to preload the suspension in a direction opposite to its normal action. The auxiliary spring system is so installed as to provide a preload which reaches maximum value when the vehicle is unloaded and reaches a minimum value when the vehicle is fully loaded.

Figure 2:
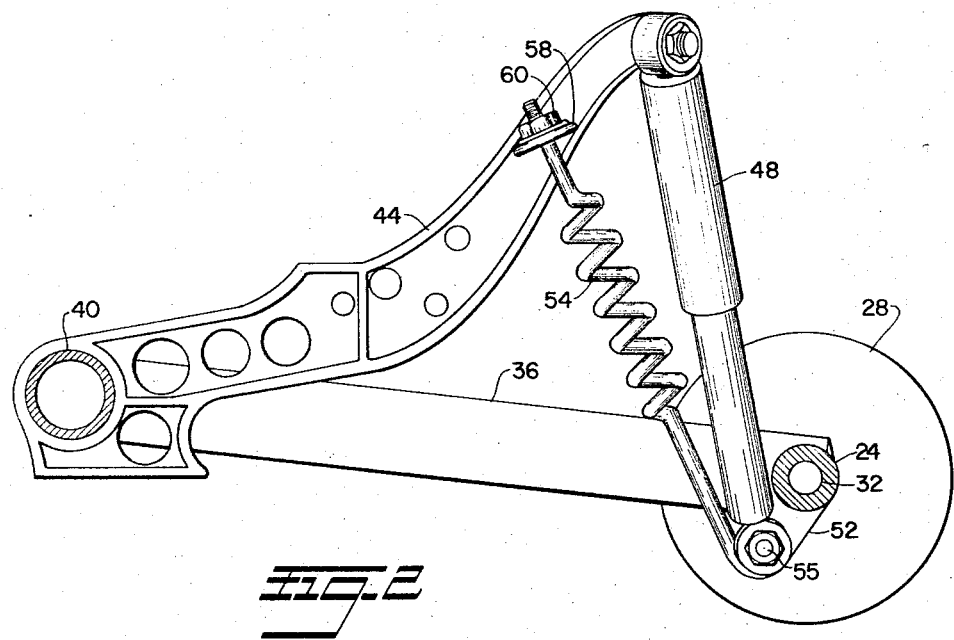

Additional objects and advantages will become apparent as the description proceeds in connection with the accompanying drawings in which:

FIGURE 1 is a semi-diagrammatic rear view of a typical swing axle construction incorporating the suspension control of the present invention; and FIGURE 2 is a fragmentary section taken along line 2—2 of FIGURE 1.

For purposes of illustration, the present invention will be described and illustrated as applied to a swing axle suspension of the type used in a Volkswagen. However, it is to be understood that the invention has equal application to swing axle suspensions of somewhat different construction.

Referring now more particularly to the drawings, 20 indicates a differential or combined differential-transmission assembly which is rigidly mounted, by means not shown, to the vehicle chassis. Projecting oppositely from the differential assembly 20 are a pair of axle housings 22 and 24 pivotally secured at their inner ends to the differential housing 20 and carrying at their outer ends the standard brake backing plates 26 and 28. Axles 30 and 32 are rotatably supported in the axle housings 22 and 24, respectively, and are operatively connected at their inner ends by universal joints to the gearing within the differential housing 20 and are adapted at their outer ends for driving connection to the brake drum and wheel assemblies which have ben omitted for clarity.

Immediately inboard of the brake assemblies 26 and 28 the axle housings 22 and 24 are connected to the free ends of radius arms 34 and 36 which are attached at their forward ends to torsion bar assemblies 38 and 40, respectively, which are supported on the vehicle chassis.

Chassis mounted support arms 42 and 44 extend upwardly and rearwardly from the region of the torsion bar assemblies 38 and 40 to the region above and forward of the respective swing axle assemblies. Shock absorbers 46 and 48 are connected at their upper ends to the rearward ends of the support arms 42 and 44 and are connected at their lower ends to plates 52 carried by the radius arms adjacent their rearward ends. The suspension thus far described is wholly conventional.

In the position of the components shown in FIGURE 1, the vehicle wheels will have zero camber. As the outer ends of the axles are swung upwardly from the position shown they will assume a negative camber which may reach as much as 10°. If the outer ends of the axles are swung down, the wheels will assume a positive camber which may reach as much as 20°. Normally, in a passenger vehicle such as the Volkswagen the torsion bars are arranged to provide a positive camber when the vehicle is lightly loaded, for example, with the driver alone. When the vehicle is fully loaded or overloaded the wheels will have a negative camber. If the suspension is adjusted to produce a zero camber at light load, then, under heavy load, the suspension will bottom. Accordingly, despite the advantages in stability and handling which result from zero camber or slightly negative camber, the suspension must be set up with a positive camber under light loads.

In accordance with the present invention this defect in swing axle suspension systems, which was previously thought to be inherent, is overcome by the provision of an auxiliary spring system which preloads the suspension system thus far described in a direction opposite to its normal direction of action. More specifically, the present invention provides an auxiliary spring 54 preferably conected to the fitting 55 to which the lower end of the shock absorbers is attached and a point on the support arm 44 forward to the point of attachment of the upper end of the shock absorber. An identical spring 56 is installed at the opposite side of the vehicle. Preferably each spring is provided at its upper end with a straight threaded end portion which passes through a fitting 58 welded or bolted to the support arm and is held in place by a nut 60. The nut 60 permits adjustment of the initial load applied by the spring to the suspension system.

When the springs 54 and 56 are installed they are under a substantial tension load and act in direct opposition to the torsion bars 38 and 40. The springs are thus effective to relatively raise the outer ends of the swing axles and reduce the camber of the rear wheels. Depending upon the strength of the springs 54 and 56 and their adjustment on installation they may reduce the normal positive camber of the rear wheels at no load or may produce a negative camber.

As the vehicle is loaded, the influence of the springs 54 and 56 on the suspension progressively decreases. Preferably the springs are so designed that they are under zero tension when the vehicle has a medium load. Under these conditions they have no effect on the camber of the rear wheels. Under full load the springs 54 and 56 may then act as compression springs. Thus, installation of the springs 54 and 56 permits the attainment of better directional stability and handling under light loads without reducing the load carrying capacity of the vehicle.

The springs 54 and 56 are constantly effective to improve the handling of the vehicle under severe cornering action since they resist and reduce the extreme positive camber normally reached when either rear inside wheel is unloaded by a sharp turn. The extreme positive camber angle encountered under these conditions in the absence of the springs 54 and 56 is undesirable since it permits the rear of the vehicle to rise, producing a corresponding rise in the center of gravity of the car thereby decreasing its resistance to overturning.

The installation of the springs 54 and 56 also increases the effective spring rate of the rear suspension. This increases the ratio of the spring rates of the rear and front suspensions with a consequent substantial reduction in the tendency of the vehicle to pitch.

It is also to be noted that the effective action of the springs 54 and 56 can be adjusted readily to produce any of a number of desired effects.

The invention may be embodied in other specific forms without departing from the spirit or essential characteristics thereof. For instance, the invention may be applied to suspensions not involving swing axles, either independent or non-independent, wherein the invention will beneficially affect spring rates, pitch, variable vehicle loading, vehicle standing height, roll resistance, etc. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A camber control suspension system for a swing axle vehicle having a frame and a pair of transverse half axles mounted at their inner ends for movement with said frame and supporting ground engaging wheels at their outer ends whereby the camber of said wheels varies with the static and dynamic loads on said wheels, said suspension system comprising a main spring system operatively connected between said frame and said axles and operative to bias said axles downwardly with respect to said frame under all load conditions, and an additional spring system connected between said frame and said axles, said additional spring system being essentially unstressed at normal medium vehicle loads and operable under high load conditions to supplement the action of said main spring system and biasing said axles downwardly to thereby reduce the change in camber otherwise produced by said high load and operable under light load conditions to oppose said main spring system to bias said axles upwardly and thereby reduce the change in camber otherwise produced by said light load.

2. The suspension system according to claim 1 wherein said additional spring system comprises coil springs loaded in tension when said vehicle is lightly loaded and loaded in compression when said vehicle is heavily loaded.

3. The suspension system according to claim 1 wherein said additional spring system comprises coil springs connected to be elongated when said frame is elevated with respect to said axles from a neutral position, said coil springs being constructed to yieldably resist said elongation.

References Cited

UNITED STATES PATENTS

| | | | |
|---|---|---|---|
| 2,083,661 | 6/1937 | Olley | 267—1 |
| 3,075,600 | 1/1963 | Ordorica | 267—57 |

FOREIGN PATENTS

| | | |
|---|---|---|
| 1,025,071 | 1/1953 | France. |

BENJAMIN HERSH, *Primary Examiner.*

PHILIP GOODMAN, *Examiner.*